US005549485A

United States Patent [19]

Chishima et al.

[11] Patent Number: 5,549,485
[45] Date of Patent: Aug. 27, 1996

[54] FITTING JIG FOR A FLAT CABLE CONNECTOR

[75] Inventors: Masamitsu Chishima; Yutaka Noro, both of Yokkaichi, Japan

[73] Assignee: Sumitomo Wiring Systems, Ltd., Yokkaichi, Japan

[21] Appl. No.: 396,717

[22] Filed: Mar. 1, 1995

[30] Foreign Application Priority Data

Mar. 4, 1994 [JP] Japan .................................... 6-060310

[51] Int. Cl.[6] .............................. H01R 9/07; B23P 19/00

[52] U.S. Cl. .............................. 439/495; 29/749; 29/750; 439/67

[58] Field of Search .................................... 439/492–499, 439/67, 77, 260; 29/748–750, 758

[56] References Cited

U.S. PATENT DOCUMENTS

| | | | |
|---|---|---|---|
| 4,713,025 | 12/1987 | Soma | 439/752 |
| 5,100,342 | 3/1992 | Olsson | 439/494 |
| 5,240,430 | 8/1993 | Soes | 439/260 |
| 5,327,641 | 7/1994 | Olsson | 29/750 |
| 5,370,552 | 12/1994 | Chishima et al. | 439/495 |
| 5,401,186 | 3/1995 | Nozaki et al. | 439/495 |
| 5,474,468 | 12/1995 | Chishima et al. | 439/495 |

*Primary Examiner*—David L. Pirlot
*Assistant Examiner*—Brian J. Biggi
*Attorney, Agent, or Firm*—Oliff & Berridge

[57] ABSTRACT

A fitting jig is provided for a connector for a flat cable that is inserted into a connector housing and is held by a slider member pushed thereinto in such a manner that the cable is prevented from coming off the connector housing. The fitting jig comprises a jig body which has an operating piece handled by the operator and pushing surfaces through which the slider member is pushed into the connector housing. When the jig body is operated with the slide member abutted against the pushing surfaces, the slide member is pushed into the connector housing, whereby the flat cable is easily and rapidly fixed in the connector.

20 Claims, 5 Drawing Sheets

FITTING JIG FOR A FLAT CABLE CONNECTOR

BACKGROUND OF THE INVENTION

The invention relates to a fitting jig for a connector adapted to connect a flat cable to fork-shaped terminals.

A connector used to connect fork-shaped terminals to a flat cable, such as a FPC (flexible printed circuit) and a ribbon wire, in which flexible conductors are arranged on an insulating sheet at predetermined intervals is well known in the art. A connector of this type has been proposed under Japanese Utility Model publication No. 6-31094.

The connector has a slide member that is set in a connector housing. With a flat cable inserted into the connector housing, operating protrusions formed on the slide member at both ends are pressed so that the slide member is pushed into the connector housing. As the slide member is pushed in this manner, a pushing portion of the slide member goes into the housing, to push the flat cable upwardly to press the latter against the terminals. Thus, the flat cable is fixedly held in the connector in such a manner that it is prevented from coming off the latter.

However, with the above-described conventional connector, the cable connecting operation is rather troublesome. As was described above, in order to fix the cable in the connector housing, the slide member must be pushed into the connector housing. On the other hand, there is a tendency for a connector to be miniaturized for instance, a connector about 15 mm in width and about 2.5 mm in height is available. Accordingly, the pushing surface formed on the slide member is extremely small, which makes it difficult to smoothly push the slide member into the connector housing. Another factor is that the cable connecting operation is carried out in a clean room. Therefore the worker must wear gloves to handle the cable and the connector, which makes it more difficult for the worker to perform the cable connecting operation.

Hence, sometimes a cable is conveyed to the following station that is not completely connected to the terminals.

SUMMARY OF THE INVENTION

In view of the foregoing, an object of the invention is to provide a fitting jig which makes it possible to smoothly and readily perform the cable connecting operation.

The foregoing object of the invention has been achieved by the provision of several embodiments of the invention.

The first embodiment employs a fitting jig for a flat cable connector in which a connector housing has a cable inserting chamber in the rear, into which a flat cable is inserted, and terminal receiving holes in the front which are communicated with the cable inserting chamber, and a slide member, which is pushed into or pulled out of the connector housing, that includes a push-in piece which, when pushed into the connector housing, presses the flat cable against the terminals in such a manner that the flat cable is prevented from coming off the connector housing. The fitting jig comprises a jig body including an operating section, and pushing surfaces through which the slide member is pushed, the jig body being allowed to externally engage with the connector housing while being positioned in place.

The second embodiment employs a fitting jig for a flat cable connector in which a connector housing has a cable inserting chamber in the rear, into which a flat cable is inserted, and terminal receiving holes in the front which are communicated with the cable inserting chamber, and a slide member, which is pushed into and pulled out of the connector housing, includes a push-in piece which, when pushed into the connector housing, presses the flat cable against the terminals in such a manner that the flat cable is prevented from coming off the connector housing. The fitting jig comprises a pair of legs which can be pushed towards each other, the legs being pushed towards each other with one of the legs contacting the connector housing, to insert the slide member into the connector housing.

The fitting jig of the first embodiment is used as follows. With the slide member pulled out of the connector housing, the front end conductor portion of the flat cable is inserted into the cable inserting chamber. Next, the jig body is mounted over the connector housing, that is, it is positioned on the connector housing as required. Under this condition, the jig body is used to push the slider member, more specifically, the slider member is pushed through the pushing surfaces of the jig body by using the operating section of the latter. Hence, the slide member is pushed into the connector housing, so that the cable is fixed in the connector housing by the push-in piece of the slider member in such a manner that it is prevented from coming off the connector housing.

The fitting jig of the second embodiment is used as follows. After the flat cable is inserted into the cable inserting chamber similarly as in the above-described case, the end portion of one of the legs of the jig is set on the connector housing while the end portion of the other leg is set on the slide member. Under this condition, the legs are pushed towards each other, so that the slide member is pushed into the connector housing. Thus, as in the first embodiment, the cable is fixedly secured in the connector housing in such a manner that it is prevented from coming off the connector housing.

The invention provides, in the case of the first embodiment, where the slide member is pushed into the connector housing with the fitting jig, that even if the connector is miniaturized, the flat cable can be smoothly and readily connected to the connector with the fitting jig.

In the case of the second embodiment, the legs of the fitting jig are pushed towards each other to push the slide member into the connector housing. Thus, the use of the fitting jig of second means is higher in work efficiency.

BRIEF DESCRIPTION OF THE DRAWINGS

The invention will be described with reference to the figures in which.

DETAILED DESCRIPTION OF THE PREFERRED EMBODIMENTS

Preferred embodiments of the invention will be described in detail with reference to the accompanying drawings.

FIGS. 1 through 5 show a first embodiment of the invention. The directions used for describing the embodiment are based on those relative to FIG. 1 where extension pieces 13*a* extend from the front of a connector housing 1.

Figure 5A:
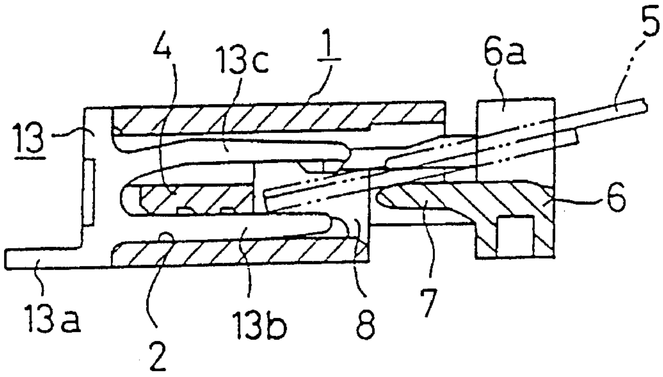
FIGS. 5A and 5B are sectional views showing the insertion of a flat cable into the connector housing.
Figure 5B:
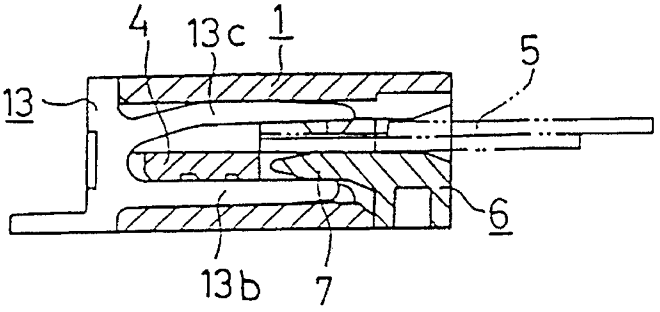

The connector housing 1 is formed of a synthetic resin as a single unit. The connector housing 1 has a number of terminal receiving holes 2 which are arranged in the direction of width of the connector housing and open in the front surface thereof. More specifically, the terminal receiving holes 2 are defined by partition walls 3 which are arranged like the teeth of a comb and extended longitudinally of the connector housing 1. In each of the terminal receiving holes 2, a horizontal terminal holding piece 4 is formed. As is seen in FIGS. 5A and 5B, the partition walls 3 extend a certain distance from the front end face of the connector housing 1, and a space is provided in the connector housing 1 which communicates with all of the terminal receiving holes 2. The space provides a cable inserting chamber 8 into which a flat cable 5 and a push-in piece 7, of a slide member 6, are inserted (described later).

Figure 1:
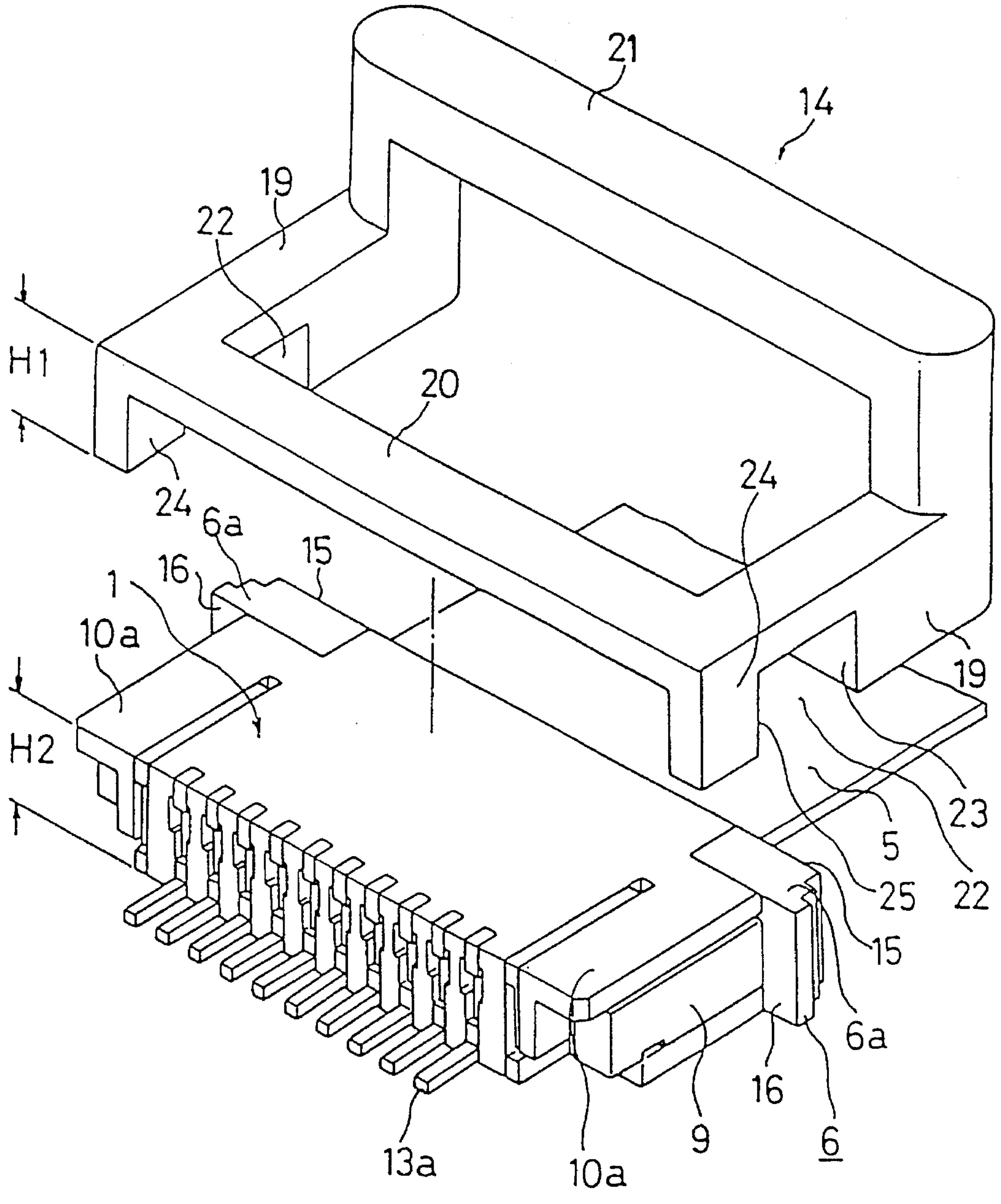
FIG. 1 is a perspective view showing a connector and a jig which constitutes a first embodiment of the invention.
Figure 2:
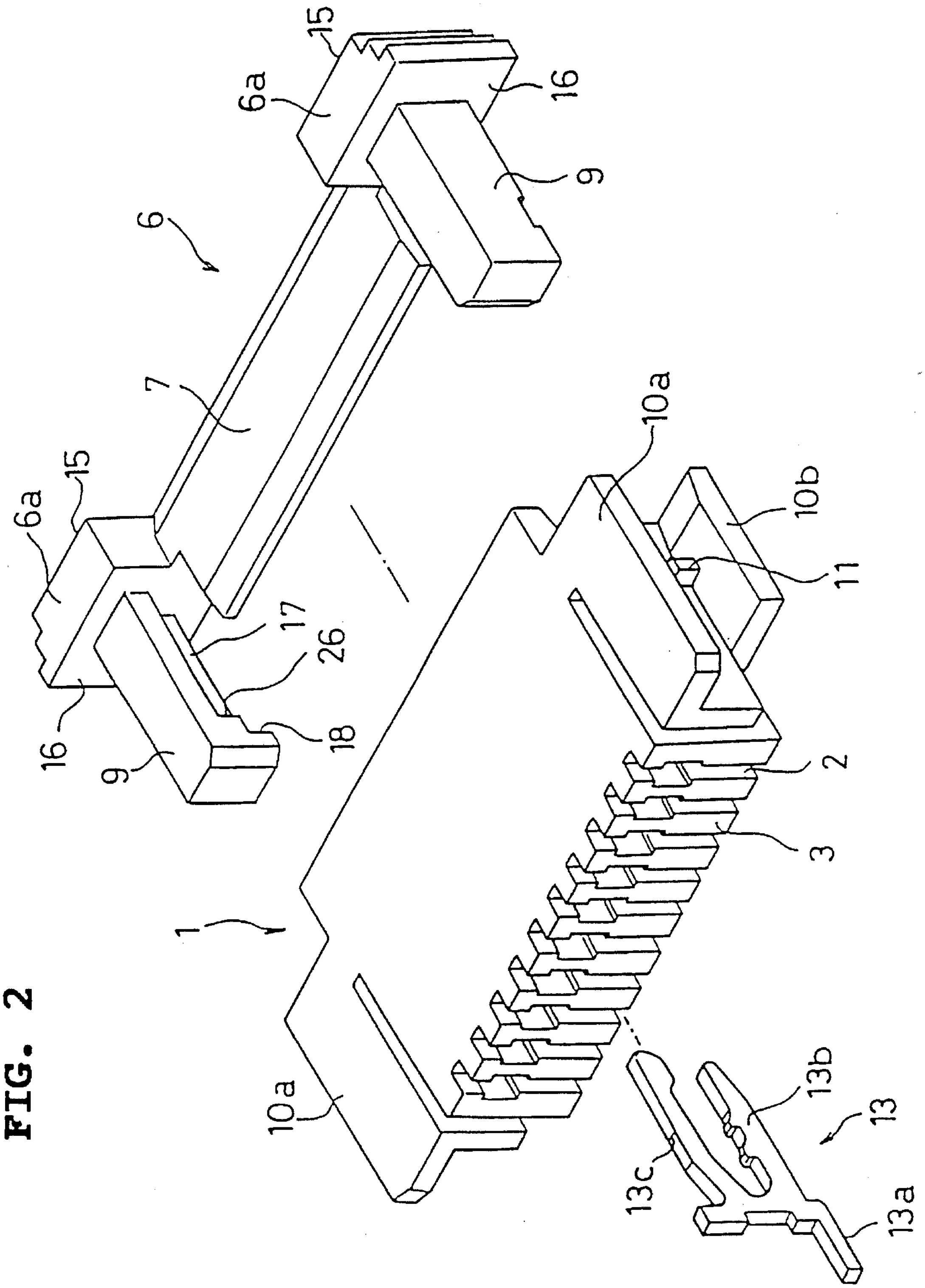
FIG. 2 is an exploded perspective view of the connector.
Figure 3:
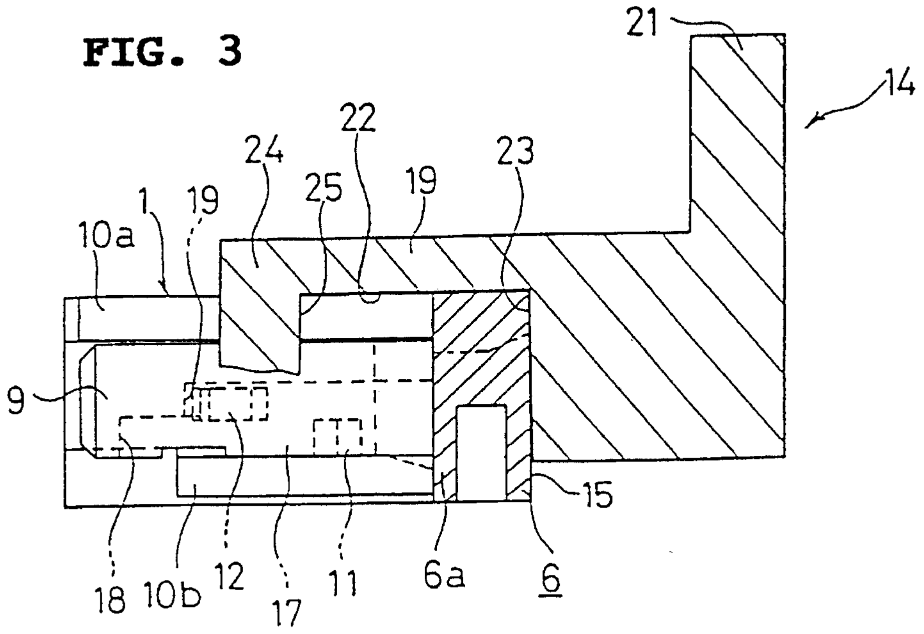
FIG. 3 is a sectional side view showing a slider member which has been pushed into the connector housing with a jig body.
Figure 4:
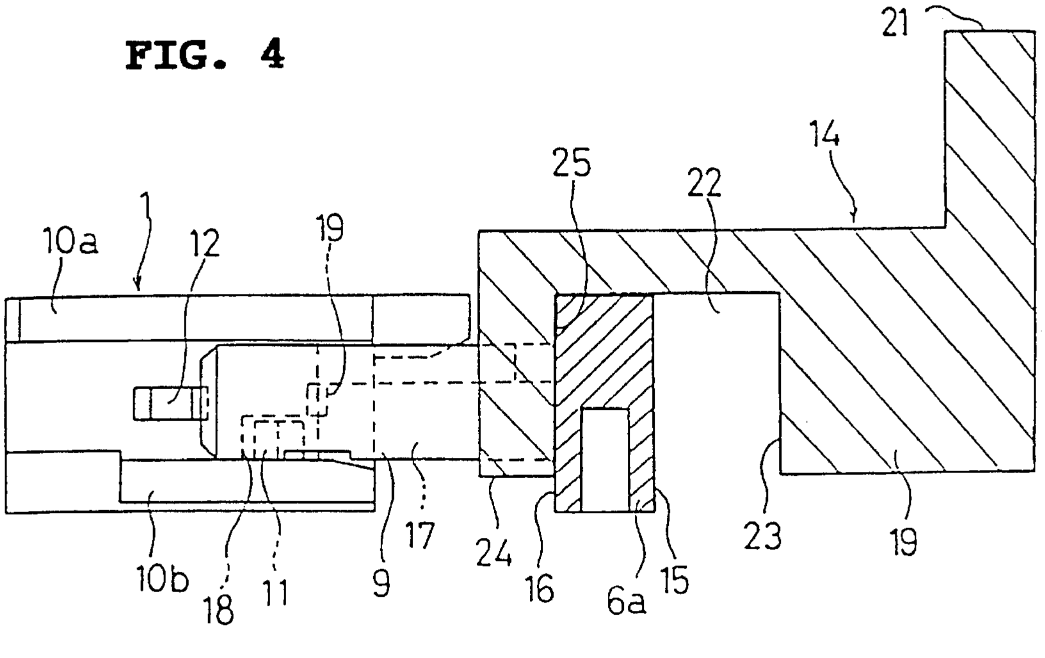
FIG. 4 is a sectional side view showing the slider member which has been pulled out of the connector housing with the jig body.

The connector housing 1 has a pair of guidewalls comprising an upper guide wall 10*a* and a lower guide wall 10*b* respectively on each side. The paired upper and lower guide walls 10*a*, 10*b* guide the holding arms 9 of the slide member 6 and hold the slide member 6. As shown in FIGS. 2, 3 and 4, on each of the two side walls of the connector housing 1, is a temporary locking protrusion 11 and a final locking protrusion 12 that are formed between the upper and lower guide walls 10*a*, 10*b*. The temporary locking protrusions 11 are to hold the slide member 6 at a temporary locking position (the slider member 6 being pulled out), and the final locking protrusions 12 are to hold the slide member at a final locking position (the slider member being pushed in as shown in FIGS. 1 and 3). As shown in FIGS. 3 and 4, each of the temporary locking protrusions 11 is positioned in the connector housing 1 toward the side of the connector housing 1 where the cable is inserted and closer to the lower guide wall 10*b* whereas each of the final locking protrusions 12 is positioned in front of the temporary locking protrusion 11 and substantially in the middle of the distance between the upper and lower guide walls 10*a*, 10*b*.

Terminals 13 are made of a metal material high in electrical conductivity. The terminals 13 are longitudinally inserted into the terminal receiving holes 2 in such a manner that they close the openings of the terminal receiving holes 2. Each of the terminals 13 has an extension piece 13*a* which extends beyond the connector housing 1 when the terminal is engaged with the connector housing 1 in the above-described manner. The front end portion of each of the terminals 13, as they are inserted into the connector housing 1, is formed into an insertion piece 13*b* and a contact piece 13*c*. When the terminal 13 is pushed into the terminal receiving hole 2, the insertion piece 13*b* is positioned under the terminal holding piece 4 while the contact piece 13*c* is brought into contact with the front end conductor portion of the flat cable 5.

As was described above, the slide member 6 has the push-in piece 7 at its mid-portion. The push-in piece 7 is inserted into the cable inserting chamber 8. The push-in piece 7 (FIG. 2) has a pushing block 6*a* on each side. The rear surfaces 15 of the pushing blocks 6*a* are used as operating surfaces by which the slide member 6 is pushed into the connector housing 1 with the body 14 (FIG. 1) of a fitting jig (hereinafter referred to as "a jig body 14", when applicable). The aforementioned holding arms 9 extend horizontally from the front surfaces of the operating blocks 6*a*, respectively. The outer parts of the front surfaces of the operating blocks 6*a* which extend beyond the holding arms 9, namely, catching surfaces 16 are used to pull the slide member 6 from the connector housing 1.

In the embodiment, the holding arms 9, when inserted between the upper and lower guide walls 10a,10b on both sides of the connector housing 1, do not protrude beyond but are flush with the upper and lower guide walls 10*a*, 10*b*.

Each of the holding arms 9 has a groove 17 in the inner surface which confronts the connector housing 1. The groove 17 is engageable with the temporary locking protrusion 11 and the final locking protrusion 12 (FIGS. 1, 3 and 4). As shown in FIGS. 1, 3 and 4, each of the grooves 17 is formed in the lower half of the inner surface of the respective holding arm 9 and it is stepped according to the heights of the temporary locking protrusion 11 and the final locking protrusion 12. More specifically, the groove 17 is so shaped that, when the slide member 6 is at the temporary locking position, a temporary locking edge 18 at the front end of the groove 17 is engaged with the temporary locking protrusion 11 as shown in FIG. 4, and when the slide member 6 is at the final locking position, a final locking edge 26, located slightly above and behind the temporary locking edge 18, is engaged with the final locking protrusion 12 (FIG. 3).

The jig body 14 (FIG. 1) is formed as one unit by molding synthetic resin. It is in the form of a frame which can be mounted on the connector housing 1 from above in such a manner that it is substantially in close contact with the connector housing 1. The jig body 14 has a side piece 19 on each side. The front ends of the side pieces 19 are connected 20 to each other by a connecting piece. The connecting piece 20, when the jig body 14 is engaged with the connector housing 1, is in sliding contact with the upper surface of the connector housing 1. The rear end portions of the side pieces 19 are formed into an operating section, that is, they extend upwardly and are then connected to each other through an operating piece 21 which may be gripped by the operator. Both side pieces 19 have a U-shaped cut 22 which opens downwardly. The U-shaped cuts 22 each have a pushing surface 23. The pushing surfaces 23 are used to push the operating surfaces 15 of the slide member 6. The front end portions of the side pieces 19 which are to the front of the U-shaped cuts, are reduced in wall thickness to avoid interference with the connector housing 1; that is, they are used as positioning portions 24. The positioning portions 24 are so designed that their inner surfaces can be brought into sliding contact with the guide walls 10*a*, 10*b*. Front surfaces of the U-shaped cuts 22, opposed to the aforementioned pushing surfaces 23, constitute drawing surfaces 25 which can be engaged with the catching surfaces 16 of the slide member 6.

As shown in FIG. 1, the height (H1) of the side pieces 19 is less than the height (H2) of the connector housing 1. This is to eliminate a difficulty that, in the case where the connector housing 1 is reflow-soldered to a printed circuit board (not shown), the jig body 14 may rub and damage the printed circuit board.

With the above-described jig body 14, the flat cable 5 is inserted into the connector with the slide member 6 held at the temporary locking position, the front end conductor portion of the flat cable 5 is inserted into the cable inserting chamber 8 of the connector housing 1 (FIG. 5A). The flat cable 5 is inserted into the cable inserting chamber 8 from above the push-in piece 7 of the slide member 6 so that the front end is positioned between the inserting pieces 13*b* and the contact pieces 13*c* of the terminals 13. Thereafter, the jig body 14 is mounted over the connector housing 1 so that the jig body 14 is engaged with the connector housing 1 with the operating surfaces 15 of the slide member 6 confronting the pushing surfaces 23. At the same time, the right and left positioning portions 24 of the jig body 14 are set in close contact with the sides of the guide walls 10*a*, 10*b* so that the jig body 14 is prevented from moving right and left with respect to the connector housing 1, that is, the jig body 14 is fixedly engaged with the connector housing 1.

When the operator moves the jig body 14 forwardly while gripping the operating piece 21, the operating surfaces 15 are pushed by the pushing surfaces 23. As a result, the temporary locking protrusions 11 are disengaged from the temporary locking edges 18 and the slide member 6 is pushed into the connector housing 1. During this operation, the right and left positioning portions 24 of the jig body slide on the side surfaces of the connector housing 1 to guide the forward movement of the jig body 14, while the holding arms 9 are held between the guide walls 10*a*, 10*b* to guide the push-in operation of the slide member 6.

When the slide member 6 reaches the final locking position, the final locking protrusions 12 are engaged with the final locking edges 26 to prevent the return of the slide member 6. At this point, the push-in piece 7 pushes the flat cable 5 upwardly to press the front end connector portion of the flat cable 5 against the contact pieces 13*c*, so that the flat cable 5 is fixedly held in such a manner that it is prevented from coming off the connector (FIG. 5B).

When necessary, the flat cable 5 can be removed from the connector by engaging the drawing surfaces 25 of the jig body 14 with the catching surfaces 16 of the slide member 6 when the jig body 14 is mounted on the connector housing 1. In this way, the jig body 14 is moved rearwardly with the aid of the operating piece 21, so that the slide member 6 is pulled out of the connector housing 1 because of the engagement of the drawing surfaces 25 with the catching surfaces 16. As a result, the flat cable 5 is released and it can be removed from the connector.

As is apparent from the above description, the flat cable can be connected to or disconnected from the connector by gripping the operating piece 21 of the jig body 14. Hence, even if the connector is miniaturized, the connection and disconnection of the flat cable can be achieved with ease. As described above, since the height H1 of the side pieces 19 is less than the height H2 of the connector housing 1, the jig body 14 is free from the problems of rubbing and damaging the printed circuit board (not shown) during the cable 5 connecting or disconnecting operation.

Figure 6:
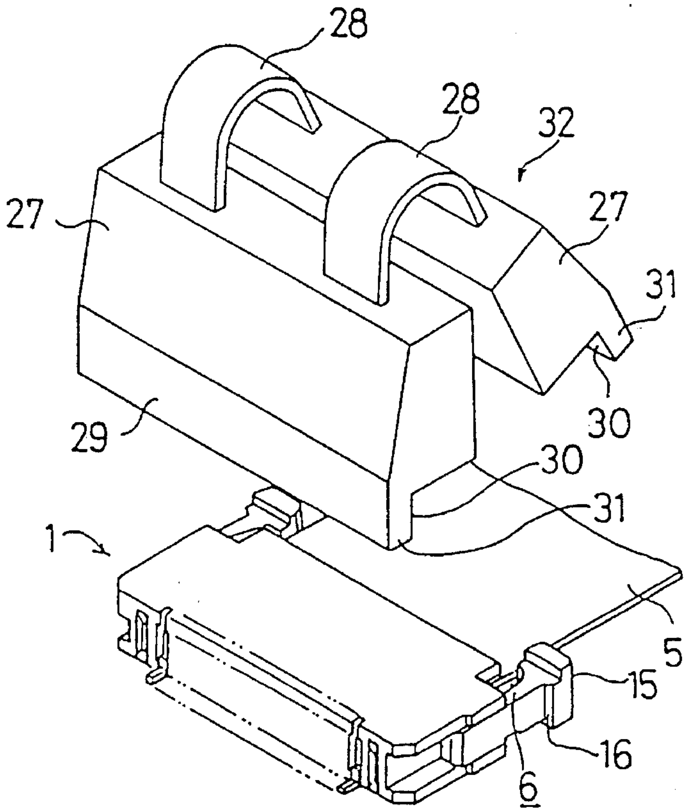
FIG. 6 is a perspective view of a connector and a jig which constitutes a second embodiment of the invention.
Figure 7:
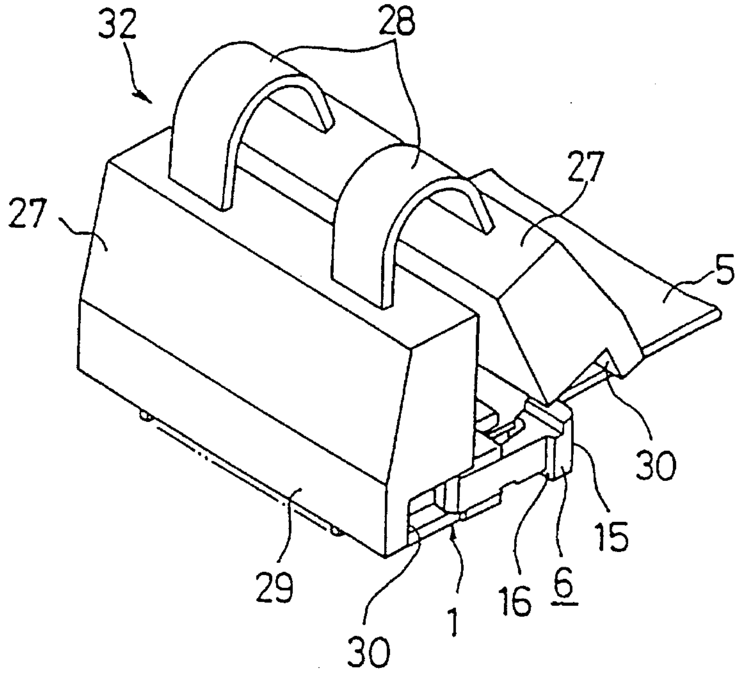
FIG. 7 is a perspective view of the insertion of a flat cable into a connector housing with a slider member pushed with the jig shown in FIG. 6.
Figure 8:
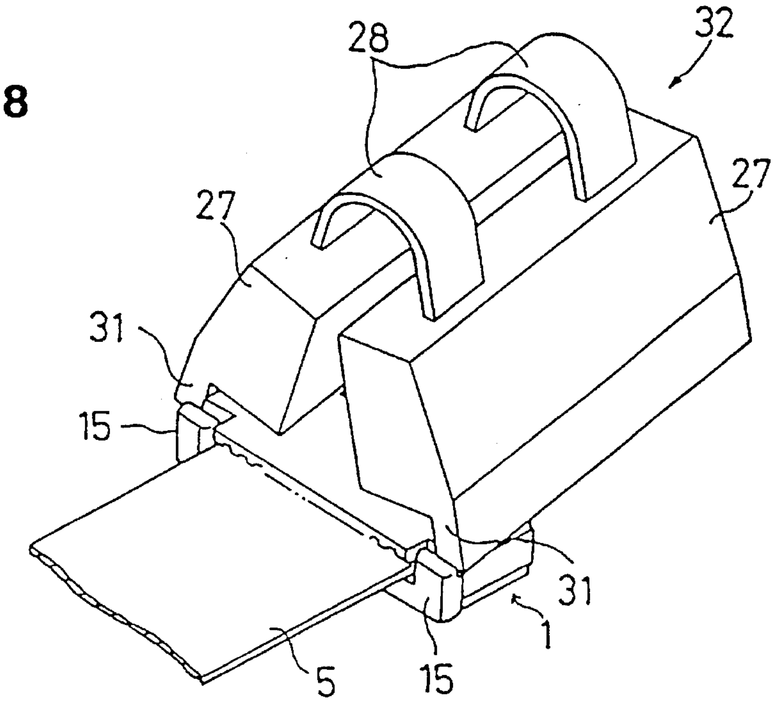
FIG. 8 is a perspective view of the removal of the flat cable with the slider member pulled out of the connector housing with the jig shown in FIG. 6.

FIGS. 6 through 8 shows a second embodiment fitting jig of the invention. In the second embodiment, a jig body 32 has a pair of legs 27, preferably of synthetic resin. The legs 27 are elastically coupled to each other through connecting pieces 28, preferably of metal, so that they may be pushed towards each other. In the second embodiment, the connecting pieces 28 are press-fitted in the legs 27 so that they cannot come off the legs 27. They may, however, be combined with the legs by insert molding. The legs 27 have cuts extended fully along the inner lower edges which are confronted with each other, that is, the lower end portions of the legs 27 are formed into walls 29 which are reduced in wall thickness (hereinafter referred to as "thin walls 29" when applicable) as shown in FIG. 6. The inner surfaces of the thin walls 29, which confront each other, namely, a pair of facing surfaces 30 are placed against the front surface of the connector housing 1 and the operating surfaces 15 of the slide member 6, respectively. As shown in FIG. 8, the thin walls 29 have drawing surfaces 31 at the ends, respectively, which are used to push the catching surfaces 16 of the slide member 6.

In the case of the second embodiment, the flat cable 5 is fixed by inserting the flat cable 5 into the connector housing 1 in the same manner as the first embodiment. Thereafter, as shown in FIG. 7, the connector housing 1 is held between the legs 27 of the jig body 32. The facing surface 30 of one of the legs 27 is abutted against the front surface of the connector housing 1 and the facing surface 30 of the other leg 27 is abutted against the operating surfaces 15 of the slide member 6. When so positioned, the legs 27 are pushed towards each other so that the slide member 6 is pushed into the connector housing 1. When the slide member 6 reaches the final locking position, the flat cable 5 is fixed. That is, the flat cable 5 is connected to the connector housing 1 merely by pushing the legs 27 towards each other. Thus, the second embodiment is higher in work efficiency than the first embodiment.

The flat cable 5 can be removed from the connector housing 1 by setting the jig body 32 such that the drawing surfaces 31 of the legs 27 confront with the catching surfaces 16 of the slide member 6 (FIG. 8). When so positioned, the jig body 32 is pushed or pulled to move the slide member 6 outwardly. When the slide member 6 is moved to the temporary locking position in this manner, the flat cable 5 can be removed from the connector housing 1.

The above-described embodiments can be modified in various ways without departing from the scope of the invention. For instance, the above-described embodiments may be used for both engagement and disengagement of the flat cable 5; however, they may be so modified that they are used only for engagement or disengagement of the flat cable 5 or in the above-described embodiments, in order to remove the flat cable 5 from the connector, the catching surfaces 16 of the slide member 6 are pushed; however, the invention is not limited thereto or thereby. That is, the jig may be so structured as to push other parts of the slide member 6.

What is claimed is:

1. A fitting jig, for a flat cable connector in which a connector housing has a cable inserting chamber in a rear portion into which a flat cable is inserted, and terminal receiving holes in a front portion which communicate with the cable inserting chamber and receive terminals and a slide member which is pushed into and pulled out of said connector housing, the slide member including a push-in piece which, when pushed into the connector housing, presses the flat cable against the terminals in such a manner that the flat cable is prevented from coming off the connector housing, comprising:

a jig body including an operating section; and pushing surfaces through which the slide member is pushed, said jig body externally engaging the connector housing while being positioned.

2. A fitting jig, for a flat cable connector in which a connector housing has a cable inserting chamber in a rear portion into which a flat cable is inserted and terminal receiving holes in a front portion which communicate with the cable inserting chamber and receive terminals, and a slide member which is pushed into and pulled from of the connector housing, the slide member including a push-in piece which, when pushed into the connector housing, presses the flat cable against the terminals in such a manner that the flat cable is prevented from coming off the connector housing, comprising:

a pair of legs which can be pushed towards each other, said legs being pushed towards each other with one of said legs engaged to the connector housing, to insert the slide member into the connector housing.

3. A flat cable connector and assembly device, comprising:

a connector housing having an upper guide wall and a lower guide wall extending from each end of an upper and a lower surface of the connector housing respectively, a cable inserting chamber in a rear portion of the connector housing, and a plurality of terminal receiving openings in a front portion of the connector housing with terminals received in at least a portion of the terminal receiving openings;

a slide having a push-in piece for being received in the cable inserting chamber, an operating block extending from each side of the push-in piece at an end away from the cable inserting chamber, and a holding arm extending from each operating block parallel to and along side of but separated from the push-in piece, each operating block having a catching surface on a side from which the holding arm extends and a rear surface on an opposite side of the operating block from the catching surface; and a jig body having pushing surface for engaging the rear surface of said operating blocks, a control surface for contacting the connector housing, and a drawing surface for engaging the catching surface of said operating blocks.

4. The flat cable connector and assembly device according to claim 3, wherein said holding arms are received between said upper and lower guide walls at the ends of the connector housing.

5. The flat cable connector and assembly device according to claim 4, wherein the connector housing has a first stop and a second stop on an end surface at each end between the upper and lower guide walls.

6. The flat cable connector and assembly device according to claim 5, wherein each holding arm has a groove in a surface facing the push-in piece, the groove having a first end surface for engaging the first stop and a second end surface for engaging the second stop.

7. The flat cable connector and assembly device according to claim 6, wherein the first stop is substantially adjacent the lower guide wall and the second stop is substantially between the upper and lower guide walls.

8. The flat cable connector and assembly device according to claim 3, wherein the jig body has a first side piece, a second side piece, a connecting piece extending between a first end of the first and second side pieces, and an operating piece extending from and connecting a second end of the first and second side pieces.

9. The flat cable connector and assembly device according to claim 8, wherein a U-shaped groove is formed in a lower surface of each of the first and second side pieces, the U-shaped grooves each engaging a one of the operating blocks, a first side surface of the U-shape groove comprising the pushing surface and a second side surface of the U-shaped groove comprising the drawing surface.

10. The flat cable connector and assembly device according to claim 9, wherein a lower surface of the connecting piece provides the control surface which rests upon an upper surface of the connector housing.

11. The flat cable connector and assembly device according to claim 9, wherein the operating piece extends from an upper surface of the first and second pieces opposite to the lower surface having the U-shaped groove.

12. The flat cable connector and assembly device, according to claim 3, wherein the jig body has a first leg, a second leg and flexible connecting means for connecting a first end of the first and second legs to one another, the first and second legs having opposing grooves at a second end thereof.

13. The flat cable connector and assembly device according to claim 12, wherein each of said first and second legs has a first and second side surface.

14. The flat cable connector and assembly device according to claim 12, wherein said first and second legs are mirror images of one another.

15. The flat cable connector and assembly device according to claim 13, wherein a surface of the groove in a one of the first and second legs comprises the pushing surface, an opposing groove surface in the other of the first and second legs comprises the control surface and a one of the first and second side surfaces of the first and second legs comprises the drawing surface.

16. The flat cable connector and assembly device according to claim 12, wherein the first leg, second leg, and connecting means are integrally formed.

17. The fitting jig according to claim 1, wherein the jig body has a first side piece, a second side piece, a connecting piece extending between a first end of the first and second side pieces, and an operating piece extending from and connecting a second end of the first and second side pieces.

18. The fitting jig according to claim 17, wherein a U-shaped groove is formed in a lower surface of each of the first and second side pieces, a side surface of each of the U-shaped grooves providing the pushing surfaces through which the slide member is pushed, opposing inner surfaces of the first and second side pieces and a lower surface of the connecting piece engaging the connector housing.

19. The fitting jig according to claim 2, wherein each leg of the pair of legs has a groove at one end, the grooves opposing one another, the groove in one leg engaging the connector housing and the groove in the other leg engaging the slide member.

20. The fitting jig according to claim 2, further comprising flexible connecting means for connecting the pair of legs.

* * * * *